May 31, 1938.                C. E. DOWNING                2,119,154
                                TRAILER
                          Filed July 9, 1937            4 Sheets-Sheet 1
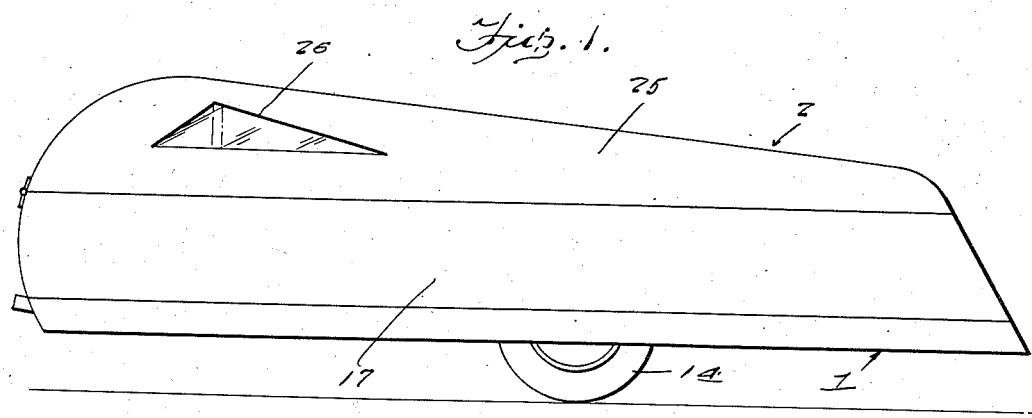
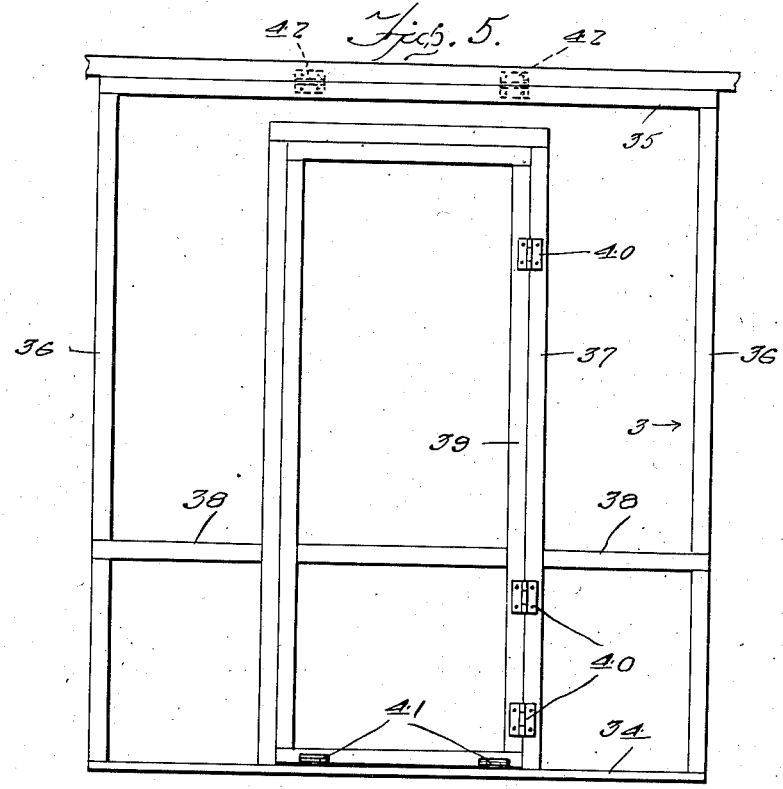
Inventor
C. E. Downing
By Clarence A. O'Brien
   Hyman Berman
                        Attorney.

May 31, 1938. C. E. DOWNING 2,119,154
TRAILER
Filed July 9, 1937 4 Sheets-Sheet 2
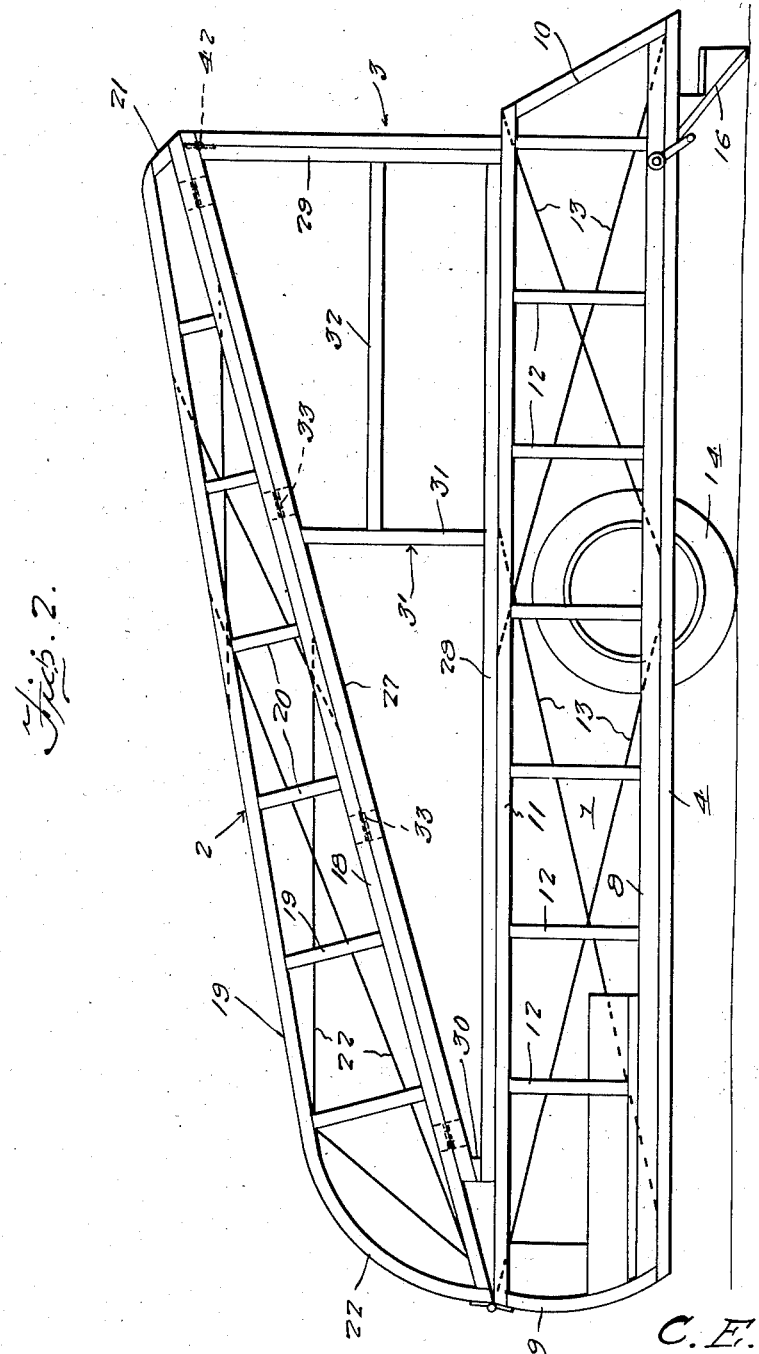
Inventor
C. E. Downing
By Clarence A O'Brien
Hyman Berman
Attorneys

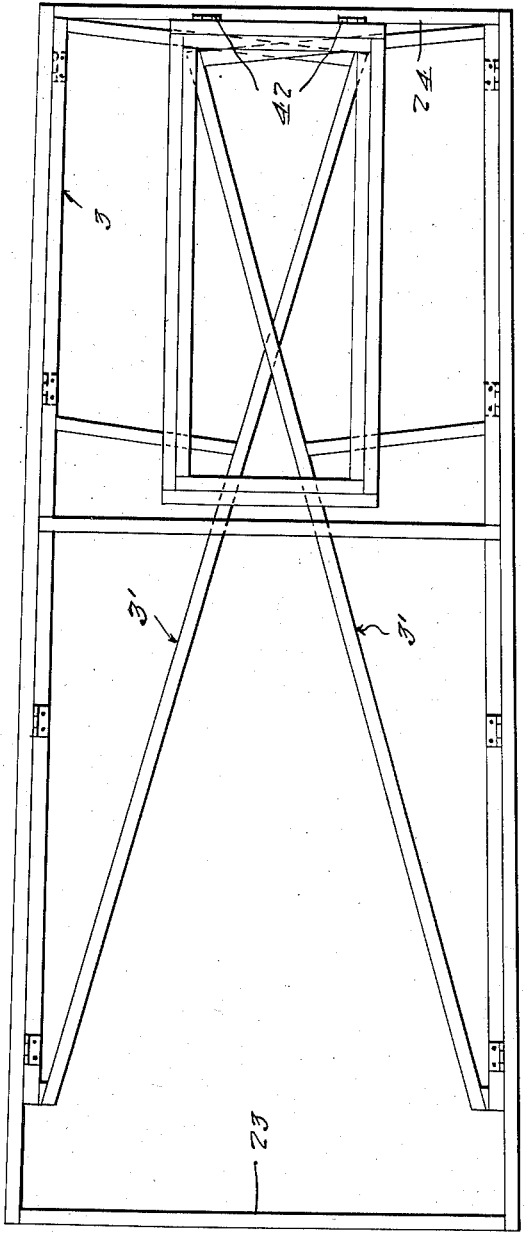

May 31, 1938. C. E. DOWNING 2,119,154
TRAILER
Filed July 9, 1937 4 Sheets-Sheet 4
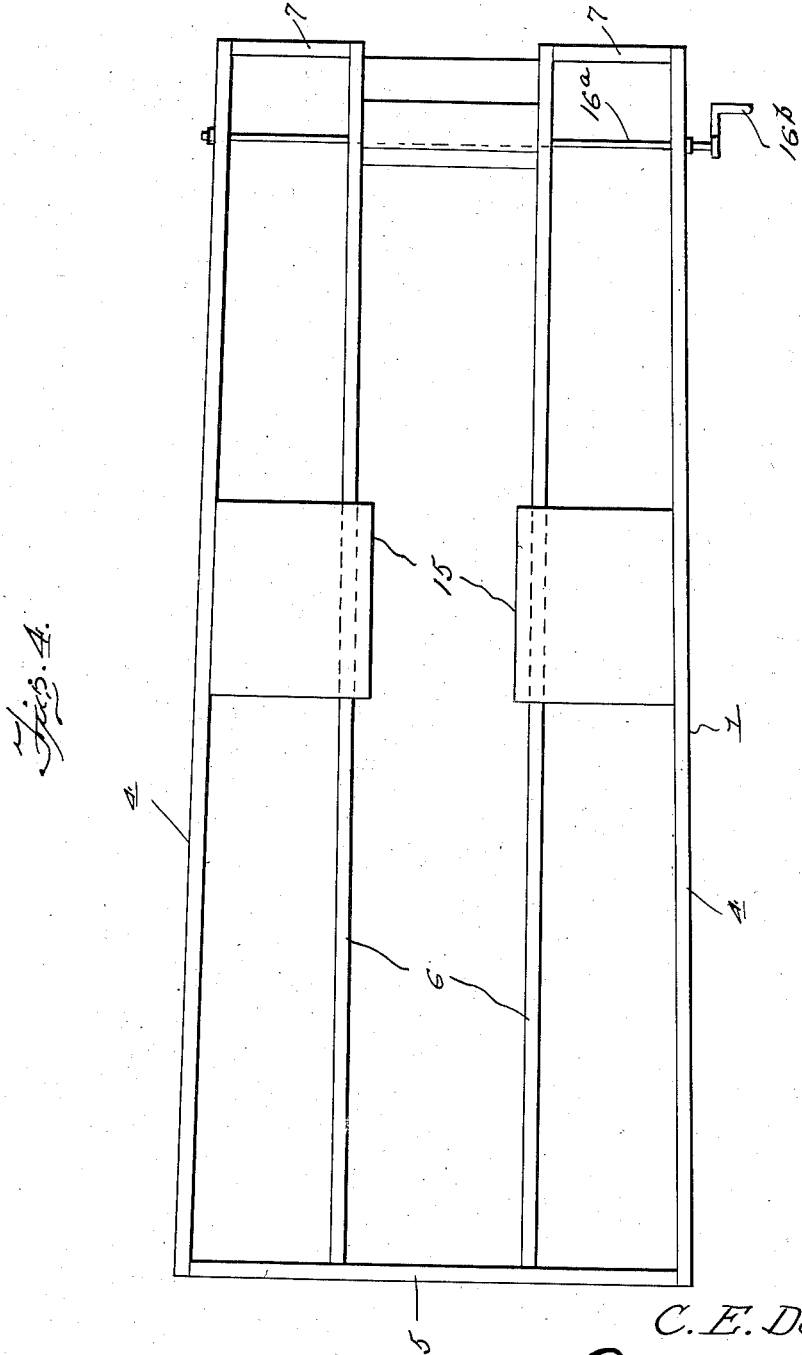

Patented May 31, 1938

2,119,154

UNITED STATES PATENT OFFICE 2,119,154

TRAILER

Charles Edwin Downing, Pemberville, Ohio

Application July 9, 1937, Serial No. 152,848

2 Claims. (Cl. 296—23)

My invention relates to improvements in trailer bodies for automobile trailers.

The invention is directed primarily toward providing a trailer body for use particularly in hauling luggage and which is collapsible when not in use into compact form to reduce to a minimum resistance to high speed travel of the same and thereby provide for economy in hauling the same on the road.

Another object is to provide a trailer body for the purpose above set forth which is collapsible to reduce the overall height thereof when on the road to thereby reduce liability to side sway, and which when collapsed is streamlined so as to reduce resistance to forward travel thereof and when unfolded forms a house car.

Still another object is to provide a trailer body of economical, sturdy construction which may be easily collapsed or set up and which is light in weight and well adapted for either living quarters or the hauling of luggage.

Other objects are also comprehended by my invention all of which together with the precise nature of my improvements will become readily apparent when the following description and claims are read with reference to the drawings accompanying and forming part of this specification.

In said drawings:—

Figure 1 is a view in side elevation of a trailer equipped according to my invention, Figure 2 is a view in side elevation, drawn to an enlarged scale, and illustrating component units of the trailer set up as for instance when the trailer is parked and in use, Figure 3 is a bottom plan view of the top unit, rear unit, and side units, illustrating the rear and side units folded, Figure 4 is a view in top plan of the bottom unit and hinged steps therein, and Figure 5 is a view in rear elevation of the rear unit.

Referring to the drawings by numerals, the basic elements of my improved trailer body are a base or bottom unit 1, a top unit 2, a rear unit 3 and side units 3', respectively, each of skeleton frame-like form and which will now be described in detail in the order named.

The bottom unit 1 comprises a pair of lower side bars or sills 4, a front transverse bar 5 suitably secured thereto, a pair of intermediate bars 6 parallel with the bars 4 and spaced apart laterally upon opposite sides of the longitudinal center of the unit, and a pair of rear bars 7, each suitably secured at one end to the rear end of a side bar 4 and at the other end to the adjacent intermediate bar 6 thereby connecting said side bars 4 and intermediate bars 6 together in pairs and leaving a space between the rear ends of the intermediate bars 6. A pair of reinforcing side bars 8 are suitably secured on top of the side bars 4 to extend along the same. At the front end of each side bar 4 is an upstanding outwardly bowed post, as at 9, and on the rear end of each side bar 4 is an upstanding forwardly inclined post as at 10. An upper side bar is suitably secured to the upper ends of the posts 8 and 9, on each side of the unit 1, as shown at 11 in Figure 2, said upper side bars extending parallel with the subjacent bars 4 and 8. Uprights extend between the upper side bars 11 and the reinforcing side bars 8, at suitable intervals, as represented at 12. Diagonal rod-like struts 13 extend between the upper and lower side bars 11 and 4 on each side of the unit 1. A bed structure, represented at 13, extends across the front end of the described unit 1 and which may, as illustrated, be supported by the reinforcing bars 8 or otherwise as desired. The unit 1 is designed to be supported at a suitable distance from the ground by means of a pair of ground wheels, one of which is shown at 14. The specific wheel mounting being immaterial to the invention has not been illustrated in the drawings. It may be stated however that the wheels 14 are designed to run in boxings, or housings, on the unit 1 and represented at 15 in Figure 4, but eliminated from the remaining figures of the drawings to avoid confusion of parts. At the rear of the unit 1, between the intermediate bars 6, is a pair of steps 16 mounted for vertical swinging movement to raise the same off of the ground. The mounting comprises a transversely extending rod 16$^a$ mounted in the bars 4 and 6 and upon which the front end of the steps 16 is swingably mounted. Any suitable means, not shown, may be provided for retaining the steps 16 in elevated position. The rod 16$^a$ is rotatable by means of a crank 16$^b$ fast on one end thereof for a purpose presently explained. As will be understood the described unit 1 is designed to be enclosed at its front and sides as by suitable siding indicated at 17 and at its bottom by suitable flooring, not shown, the flooring being omitted over the steps 16.

The top unit 2 comprises a pair of side frames, one of which is shown in detail in Figure 2, each including a lower side bar 18, an upper side bar 19, uprights 20 extending between said bars 17 and 18, intermediate the ends thereof in spaced apart relation, and a rear end bar 21 inclining forwardly and upwardly. The front end of each upper side bar 19 is bowed outwardly and downwardly, as at 22, to form a rounded front on the frame and said bars 18 and 19 of each frame converge rearwardly to the related rear bar 21. Struts 22' similar to struts 13 extend between the side bars 18 and 19. The described frames of the top unit 2 are connected together as by front and rear cross bars 23 and 24 extending between the lower side bars 18. Suitable roofing, not shown, covers the unit 2 and siding 25 is secured in any suitable manner to the sides thereof. Windows, as at 26, may be provided in the siding 25. The described top unit 2 is hinged as at 2', at its front end to the unit 1 for vertical swinging, or closing movement thereon to seat on top of the bars 11 of unit 1, or, to be raised or elevated, off said bars. The hinge connection includes a hinge bar 2" removable so that the top unit 2 may be removed. In the seated position thereof said unit 2 forms a downwardly and rearwardly sloping top for the structure with a receding front and whereby the structure is streamlined as will be understood and a closed body formed therefor. In this connection, as will be clear, the rear end of the top unit merges with the rear post 10 to streamline the rear end of the structure. The top unit is designed to occupy the closing position indicated when the trailer is on the road. The described structure is so designed that in the closing position of the top unit 2, the overall height of the structure at the front is less than that of the rear window of the average automobile from the ground so that vision through said window is not obstructed.

When the trailer is parked the top unit 2 is swung upwardly to opening or elevation position, as illustrated in Figure 2, to increase the height of the structure, such increase of course being from front to rear. The before-mentioned side units 3' and the rear unit 3 are so designed that under this condition said units close the gap between the sides and the rear end of the units 1 and 2.

As best shown in Figures 2 and 3, the side units 3' each comprise upper and lower side bars 27 and 28, respectively, converging forwardly into contiguous relation, a rear upright 29 connected to said bars at the rear ends thereof, a connection 30 between the front ends of said bars 27 and 28, an intermediate upright 31, and a horizontal brace bar 32 extending between said uprights 29 and 30, all of which parts are arranged to impart a wedge-shaped forwardly tapering form to the unit 3' so that said unit may be fitted between the lower side bar 18 of the top unit 2 and the upper side bar 11 of the bottom unit 1 on the related side of the structure and when the top unit 2 is elevated into a forwardly slanting position suitable to provide for standing room in the rear part of the structure. As will be understood the side units 3' are to be covered by suitable siding not shown. Each side unit 3' is swingably mounted, as by hinges 33, on the related lower side bar 18 of the top unit 2 to fold inwardly and upwardly under said top unit.

The rear unit 3 has the form of a rectangular frame comprising a lower bar 34, a top bar 35, and side bars 36 all suitably secured together. A door frame 37 is built into the rear unit 3, as for instance by means of cross bars 38. The door 39 is hinged to the frame 37, as at 40, and provided on its bottom edge with anti-friction rollers 41 engaging the lower bar 34. The rear unit 3 is hinged, as at 42, to the rear bar 24 of the top unit 2 to fold upwardly under said top unit. The height of the rear unit 3 is such that when the side units 3' are unfolded, that is to say in use, said rear unit engages the floor, not shown, and supports the rear end of the top unit 2. In the folded, or collapsed position, of the units 2, 3 and 3', the rear unit 3 folds up under the side units 3' as shown in Figure 3. The various units described are formed preferably of light, strong wood.

The beforementioned rod 16ª and crank 16ᵇ may be used as a windlass to hoist the top unit 2' into elevated position by attaching suitable intermediate hoisting mechanism, not shown, to said rod and top unit. Said rod 16ª may also be attached by any suitable connection, not shown, to the bottom of the rear unit to pull the same rearwardly along the bottom unit 1, on the anti-friction rollers 41 to set up or unfold said rear unit. Any suitable means may be utilized for holding the rear unit 3 and side units 3' in folded relation.

The invention will, it is believed, be understood from the foregoing description without further explanation.

Manifestly changes in form, structure and relation of parts may be resorted to without departing from the inventive concept as disclosed and right is herein reserved to all such modifications falling within the scope of the claims appended hereto.

What I claim is:—

1. A trailer body comprising a pair of top and bottom units, respectively, each including permanent sides, the sides of said units fitting together in edge-to-edge engaging relation to form the side walls of the body, the top unit decreasing in height rearwardly and having curved ends imparting a streamlined contour thereto and being hinged at its front end to the front end of the bottom unit for elevation into forwardly and downwardly inclined position to increase the overall height of said body, a pair of triangular side members adapted to be interposed between the sides of said units in edge-to-edge relation thereto in the elevated position of the top unit to close the space between said sides and support the top unit, said side members being hinged to the lower edges of the sides of the top unit to be folded into the top unit out of interposing position, and means to support the top unit in elevated position in the folded position of said side members.

2. A trailer body comprising a pair of top and bottom units, respectively, each including permanent sides, the sides of said units fitting together in edge-to-edge engaging relation to form the side walls of the body, the top unit decreasing in height rearwardly and having curved ends imparting a streamlined contour thereto and being hinged at its front end to the front end of the bottom unit for elevation into forwardly and downwardly inclined position to increase the overall height of said body, a pair of triangular side members adapted to be interposed between the sides of said units in edge-to-edge relation thereto in the elevated position of the top unit to close the space between said sides and support the top unit, said side members being hinged to the lower edges of the sides of the top unit to be folded into the top unit out of interposing position, and means to support the top unit in elevated position in the folded position of said side members and including a rear end closure member bridging the space between said top unit and the bottom of the bottom unit and being hinged to the top unit to swing inwardly beneath the folded side members for supporting the latter in folded position.

C. E. DOWNING.